United States Patent [19]

Harter et al.

[11] Patent Number: 4,741,252
[45] Date of Patent: May 3, 1988

[54] DIAPHRAGM OF THE ROLLING TYPE HAVING A MEMBRANE PORTION AND A REINFORCING PORTION

[75] Inventors: James B. Harter; Donald J. Novkov, both of Tempe, Ariz.

[73] Assignee: Allied-Signal Inc., Morris Township, Morris County, N.J.

[21] Appl. No.: 911,280

[22] Filed: Sep. 24, 1986

[51] Int. Cl.⁴ .......................... F01B 19/00; F16J 3/00
[52] U.S. Cl. .................... 92/103 SD; 92/102; 92/103 R; 92/98 D; 92/99; 92/48
[58] Field of Search .............. 92/102, 103 R, 103 SD, 92/98 D, 99, 48, 94, 103 F

[56] References Cited

U.S. PATENT DOCUMENTS

| 1,641,780 | 9/1927 | Parker | 92/103 R |
| 2,514,388 | 7/1950 | Gilmore | 92/103 R |
| 2,725,078 | 11/1955 | Glancy | 92/103 R |
| 2,976,726 | 3/1961 | St Clair et al. | 92/103 F |
| 3,137,215 | 6/1964 | Taplin | 92/103 R |
| 3,236,158 | 2/1966 | Taplin | 92/103 R |

FOREIGN PATENT DOCUMENTS 569999 12/1943 United Kingdom ............ 92/103 R

Primary Examiner—Robert E. Garrett
Assistant Examiner—Thomas E. Denion
Attorney, Agent, or Firm—Terry L. Miller; James W. McFarland

[57] ABSTRACT

A diaphragm particularly for rolling-diaphragm type fluid pressure motors. The invention provides greatly improved service life of the motor, particularly under adverse condition in which conventional diaphragms fail quickly.

8 Claims, 1 Drawing Sheet

DIAPHRAGM OF THE ROLLING TYPE HAVING A MEMBRANE PORTION AND A REINFORCING PORTION

BACKGROUND OF THE INVENTION

This invention relates generally to fluid pressure motors. More specifically, this invention relates to fluid pressure motors of the springdiaphragm type which may also be of the "rolling" or convoluted diaphragm configuration. With still greater particularity, this invention relates to a particular diaphragm structure and method of making such a diaphragm for the above-described types of fluid pressure motors.

Conventional diaphragms for "rolling" diaphragm fluid pressure motors are constructed by forming an essentially hat shaped fabric part which is thereafter impregnated with an elastomer to render the diaphragm gas impermeable. Generally the fabric from which the hat shaped part is formed is a square weave of fibrous material, either stranded or twisted together. When such a square weave fabric is formed into a hat shaped configuration, the walls of the cylindrical portion of the hat, which later become the "rolling" or convoluted part of the diaphragm, have four areas within which the fibers of the square weave extend radially and transversely. These radially extending fibers are able to flex easily as the diaphragm "rolls" during action of the fluid pressure motor, and the transverse fibers are carried along without significant relative movement between the radial and transverse fibers. However, the square weave of the fabric also results in there being four areas of the cylindrical portion of the diaphragm wherein the fibers of the weave lie at substantially 45 degrees to a radial line. When the fibers within these latter portions of the diaphragm "roll" through the convoluted part of the diaphragm as the actuator moves, the fibers move angularly relative to one another in somewhat of a sawing or teeter-totter motion. The Applicants have discovered that conventional elastomerically impregnated fabric rolling diaphragms, because of this aforementioned sawing of the fibers in certain areas of the diaphragm, experience an overstressing of the elastomer in these areas and eventual failure of the diaphragm.

A conventional teaching which seeks to improve the flexibility of the diaphragm is illustrated by U.S. Pat. No. 2,730,131 issued to H. L. Asp et al wherein a somewhat flat diaphragm intended for relatively short movement is formed by cutting a disk from a thick walled cylinder of material such as Teflon. Prior to severing the disk from the cylinder, a multitude of axially transverse radial cuts are made extending from the outer perimeter of the incomplete disk, which is to become the diaphragm, part way to the center thereof. This multitude of radially extending cuts results in a completed diaphragm having a plurality of distinct transverse layers which are separately movable relative to one another during flexing of the diaphragm. However, the diaphragm taught by the Asp et al patent is not taught as being appropriate for use in a rolling diaphragm type of fluid pressure motor. Further, the Asp et al diaphragm does not incorporate any type of fabric or fibrous reinforcement within the impermeable flexible or elastomeric material from which the diaphragm is formed. This lack of fabric reinforcement within the diaphragm as taught by Asp et al is believed by the Applicants to result in a diaphragm having relatively limited pressure capabilities. It is clear that the diaphragm as taught by Asp et al must rely entirely upon the strength of the elastomer alone to resist the forces imposed upon the diaphragm by operating pressure of the fluid motor.

A fabric reinforced elastomeric membrane is taught by U.S. Pat. No. 3,376,898 issued to Hugley, wherein the membrane is subdivided into discrete axially extending layers to enhance the flexibility of the membrane. However, the cylindrical membrane teaching of the Hugley patent is not seen by the Applicants as being applicable to the making of diaphragms for rolling diaphragm type of fluid motors. While the Hugley patent does teach a fluid impermeable membrane having a plurality of distinct layers which are relatively movable, it is noted that each one of the layers within the membrane is composed of a fibrous fabric impregnated with an elastomer. In this respect then the Hugley patent will be seen to aggregate conventional diaphragm teachings.

SUMMARY OF THE INVENTION

In view of the above it is recognized that an improved diaphragm, particularly for rolling diaphragm applications, is needed. As noted above the Applicants have observed that the fibers of a rolling diaphragm, particularly in the areas where the fibers cross one another at substantially 45 degrees with respect to a radial line, saw against one another during movement of the diaphragm such that the elastomer impregnated into the fabric is overstressed and fails. Accordingly, it is an object of the present invention to provide a diaphragm particularly for rolling diaphragm applications wherein the fibers of the fabric reinforcement thereof are free to move during working of the diaphragm.

Accordingly, the present invention provides a diaphragm including a gas-impermeable flexible elastomeric membrane member having a first face thereof exposed to a relatively higher fluid pressure effecting a force on the membrane member. The membrane member has a pair of relatively movable portions interconnected by a flexing portion, the latter being free of fibrous inextensible reinforcing material. A gas-permeable, flexible substantially inextensible fibrous reinforcing fabric member is in supporting relationship with a second face of the membrane member opposite the first face. This fabric member communicates a relatively lower fluid pressure to the second face of the membrane to effect the force thereon. The fabric member similarly has a respective pair of relatively movable portions interconnected by a respective flexing portion. The flexing portion of the fabric member is free of elastomeric material.

An advantage of the present invention over conventional diaphragms is a markedly improved sensitivity of the diaphragm to differential pressures. That is, because the diaphragm is composed of an air impermeable membrane supported by an air permeable fabric, both of which are relatively limp, the diaphragm is able to respond by movement to smaller differential pressures than those to which a conventional diaphragm will respond. The inventive diaphragm is also able to function at the same high pressures as a conventional diaphragm. Further, testing has shown that the flex life of a diaphragm according to the present invention far exceeds that of a conventional diaphragm made with the same materials. An additional advantage of the present invention is a reduced "memory" of the diaphragm. In other words, conventional diaphragms because they are composed of a fabric material impregnated with an elastomer are rather strongly shape-retaining. On the other hand, the present diaphragm has a much reduced shape-retaining character in comparison with conventional diaphragms. Further advantages of the present invention reside in reduced manufacturing costs. One of the reasons for reduced cost is that conventional diaphragms require adhesion testing of the fabric material after it is impregnated with elastomer. The adhesion of the elastomeric material with the fabric must be tested by an application of gas pressure to the completed diaphragm. Such adhesion testing is not necessary with the diaphragm according to the present invention. Accordingly, it is believed that reduced scrappage rates will also result in manufacture of diaphragms according to the present invention in comparison with conventional diaphragms. Additional objects and advantages of the present invention will be apparent from a reading of the following detailed description of a single preferred embodiment of the invention.

BRIEF DESCRIPTION OF THE DRAWING FIGURES

FIG. 1 is a partial cross-sectional view of a fluid pressure motor of the spring-rolling diaphragm type embodying the invention; and FIG. 2 depicts two component parts of a diaphragm according to the present invention.

DETAILED DESCRIPTION OF THE PREFERRED EMBODIMENT

Figure 1:
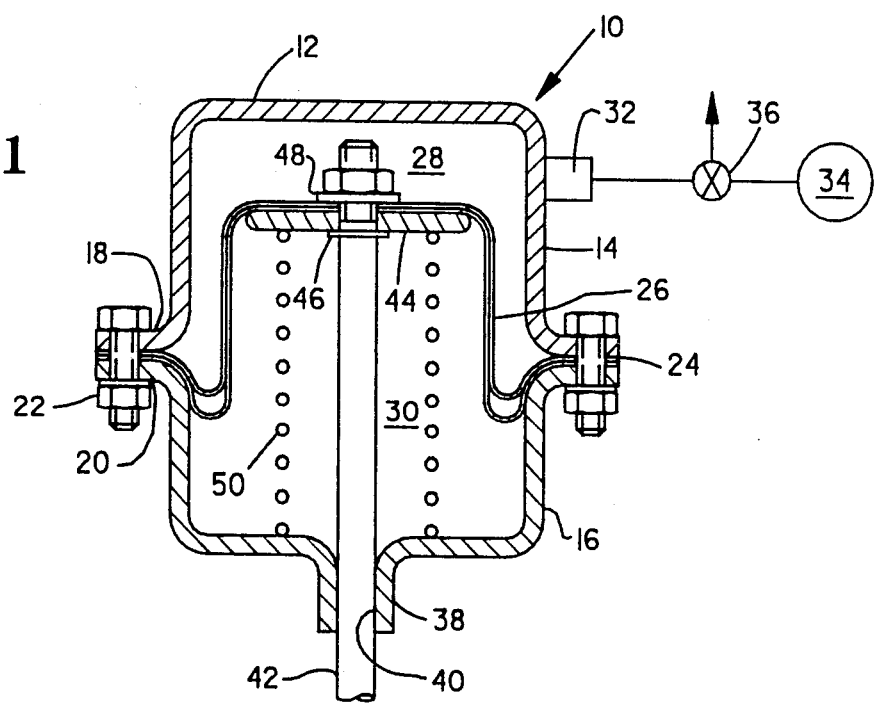

FIG. 1 depicts a fluid pressure motor 10 of the spring-rolling diaphragm type having a cylindrical chambered housing 12. The housing 12 includes a first part 14 and second part 16, each having a respective radially extending flange 18, 20, intersecured by an annular array of fasteners 22. The flanges 18, 20 of housing parts 14, 16 sealingly clamp therebetween a marginal flange portion 24 of a diaphragm 26. By sealingly dividing the interior of housing 12 into a pair of variable-volume chambers 28, 30, the diaphragm 26 defines a movable separator between the two chambers. Housing 12 defines a port 32 opening to cavity 28 by which pressure fluid from a source 34 may be selectively introduced to and vented from chamber 28. A two-way valve 36 is employed to selectively supply and vent pressure fluid from chamber 28.

Housing part 16 defines a guide portion 38 defining a bore 40. An actuator rod 42 is movably received in the bore 40 and in chamber 30. Because the actuator rod 42 defines a clearance in bore 40, the chamber 30 is fluidly communicated with ambient pressure. At the inner end of actuator rod 42 an annular support plate 44 is captively received between a shoulder 46 on rod 42 and the diaphragm 26. A retainer 48 threadably engages rod 42 and sealingly engages diaphragm 26 to secure the support plate on the rod 42 against shoulder 46.

In order to resiliently bias the actuator rod support plate and diaphragm 26 to a first position (not illustrated) wherein the rod 42 is fully withdrawn into housing 12, a coil compression spring 50 extends between housing part 16 and support plate 44. With the exception of diaphragm 26, all of the foregoing is conventional, and those skilled in the art will recognize that a load may be attached to the distal end of rod 42. The load may then be selectively moved by manipulation of valve 36 to supply and vent pressure fluid from chamber 28. The position of the load member will be a function of the pressure in chamber 28, the effective area of diaphragm 26, and the preload and rate of spring 50, as well as the static and dynamic friction, and weight or spring force (if any) of the load.

Figure 2:
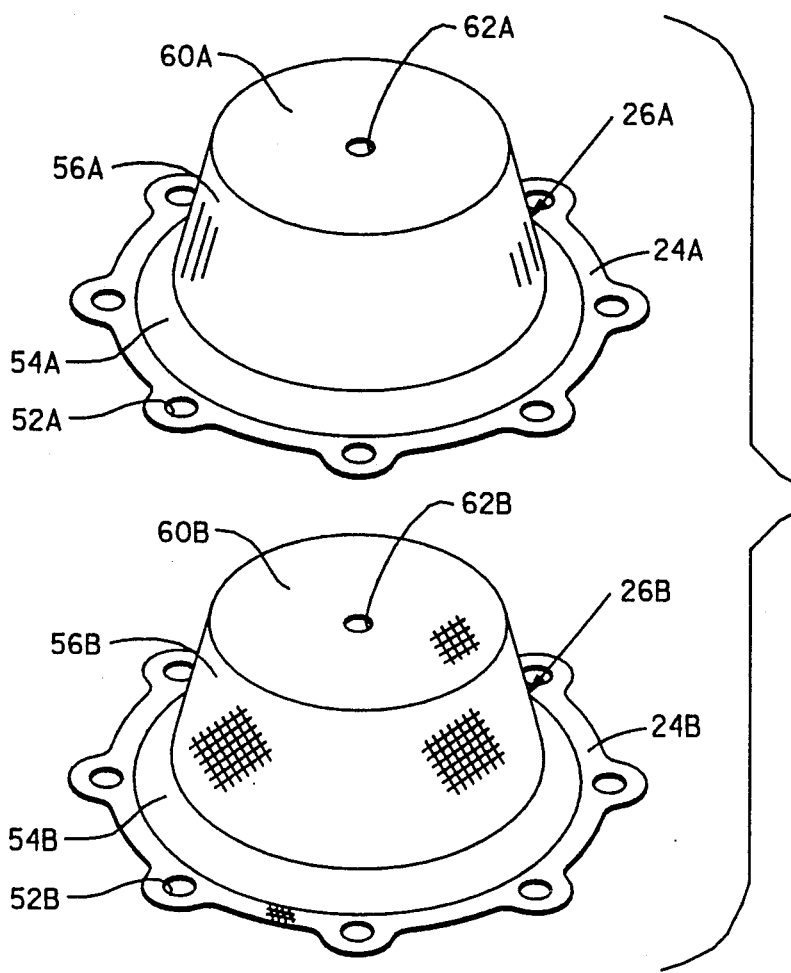

Turning now to FIG. 2, it will be seen that the diaphragm 26 is in fact composed of two separate component parts. Part 26A is a molded, yieldable but shape-retaining gas impermeable membrane. At first blush, the membrane 26A could be mistaken for a conventional, preformed rolling diaphragm. However, as pointed out above, conventional diaphragms include a reinforcing fabric ply, or multitude of plies, which are impregnated with elastomer. In contrast, the membrane 26A is entirely elastomer material with no fibrous or fabric reinforcement thereof. Consequently, membrane 26A is highly yieldable.

Diaphragm 26 also includes a molded yieldable shape-retaining gas-permeable fabric member 26B. The fabric member 26B is formed of woven fibrous material which under heat and pressure is formed over a die to the configuration illustrated. Even though fabric member 26B is shape-retaining, it is very yieldable, having only the stiffness of a compliant fabric to retain its molded shape. Fabric member 26B is free of elastomeric material. Hereafter reference numerals referring to one of the components 26A, 26B and not including a postscript A or B, refer to features common to both.

Comparing the component parts 26A and 26B of diaphragm 26, it will be seen that each includes a radially outer, radially extending flange portion 24. Each of the flange portions 24 defines a like annularly arrayed multitude of bolt holes 52 which align to pass fasteners 22, viewing FIG. 1. Immediately radially inward of flange portion 24, each part 26A, 26B, defines a frustroconical transition portion 54. The transition portion 54 connects flange portion 24 with a cylindrical or slightly frustroconical flexing portion 56. Viewing FIG. 1, it is seen that portion 56 during working of the actuator 10 forms a convolute referenced with numeral 58. As the actuator rod 42 moves linearly in guide portion 38, the material of portion 56 flexes through convolute 58. The "rolling" motion of this convolute with working of diaphragm 26 leads to the general descriptive term "rolling diaphragm". Preferably, the flexing portion 56 is slightly frustroconical to predispose the material of portion 56 to form convolute 58 such that the radially inner and radially outer portions thereof do not interface with or rub against one another as the diaphragm 26 moves during working of the actuator 10. Further, diaphragm 26 also includes a central disk portion 60 which overlies support plate 44 and which defines an aperture 62 receiving rod 42 adjacent retainer 48.

During operation of the actuator 10 a supra-ambient pressure in chamber 28 results in diaphragm 26 transferring force to support plate 44. The disk portion 60 of diaphragm 26 presses on support plate 44 according to the area thereof and the differential pressure between chambers 28 and 30. However, the effective area of diaphragm 26 exceeds that of disk portion 60, and this additional increment of force is conveyed to support plate 44 by tension forces in flexing portion 26. So long as the differential pressure between chambers 28 and 30 is below a determined relatively low level set by the elasticity of membrane part 26A, the Applicants believe that these tension forces are carried and transmitted by the membrane part 26A alone. In other words, below a certain differential pressure and output force for actuator 10, the fabric part 26B of diaphragm 26 does not carry any significant stress. Under these working conditions, the fabric part 26B is simply carried along and the flexing portion 56 thereof flexes through convolute 58 without actually supporting membrane part 26A.

However, when the differential pressure between chambers 28 and 30 exceeds the determined level, membrane part 26A is believed to stretch slightly, particularly in the flexing portion 56A thereof, to be supported by the flexible but substantially inextensible fabric part 26B. Consequently, tension forces which exceed the relatively low level described above are transmitted by membrane part 26A to fabric part 26B for transmittal to support plate 44. From the above, it is easily appreciated that membrane part 26A is never forced to carry tension forces significantly exceeding the relatively low level previously described. It is also clear that the fibers of fabric part 26B are always free to move relative one another in flexing portion 56 thereof.

Comparative testing of conventional diaphragms and of diaphragms according to the present invention, both constructed using the same fabrics and elastomeric materials, have confirmed that the flexing life of the inventive diaphragm ranges from an improvement of from about 150% to as much as almost 430% of the life of a conventional diaphragm. Specifically, the Applicants have comparatively tested conventional diaphragms and diaphragms made acccording to the present invention by installing a plurality of actuators 10 in an oven. With the oven temperature and supply air to the actuators both maintained at substantially 400° F., the actuators were repeatedly cycled through their full movement until the diaphragm failed. Among the conventional diaphragms tested, none endured even 100,000 cycles. Some conventional diaphragms failed in as little as 15,000 cycles.

On the other hand, diaphragms according to the invention endured a minimum of 100,000 cycles. In fact, some inventive diaphragms endured over one-quarter million (250,000) cycles without failure. In one case, a diaphragm which had survived 250,000 cycles at 400° F. was subjected to additional cycles at a temperature of 600° F. in an attempt to determine its life under very adverse conditions. This diaphragm endured an additional 15,700 cycles, which is more than the life of some conventional diaphragms at 400° F.

Turning now to manufacture of a diaphragm according to the invention, it will be seen from FIG. 2 that membrane 26A and fabric part 26B appear to be identical in shape. In fact, these parts may be formed using the same male pattern. Sheet elastomer or sheet fabric may be held in a frame and stretched over the male pattern while heat and pressure or vacuum are used to conform the sheet material to the pattern. After removal from the pattern, the perimeter of flange 24 is trimmed and holes 52, 62 are punched to result in the generally "hat" shaped articles depicted by FIG. 2. Installation of diaphragm 26 in an actuator simply involves nesting fabric part 26B within membrane part 26A and assembly of the nested parts into an actuator in a conventional manner. The only caveat to be observed is that the membrane side of diaphragm 26 be the side exposed to the higher pressure. If desired to reduce the parts count of the actuator, the parts 26A and 26B may be adhesively secured together at the flange portion 24.

While the present invention has been described by reference to a particular preferred embodiment of the invention, such reference does not imply a limitation on the invention, and none is to be inferred therefrom. The invention is intended to be limited only by the spirit and scope of the appended claims which provide additional disclosure and definition of the invention.

We claim:

1. A diaphragm having a flexing portion and comprising:
    a gas impermeable elastomeric yieldably shape-retaining membrane member composed essentially of relatively thin sheet-like elastomeric material free of fibrous reinforcement and formed to a selected configuration;
    a gas permeable, yieldably shape-retaining fabric member composed essentially of inextensible fibrous woven cloth formed to a determined configuration complementary with said selected configuration, said shape-retaining fabric member determined configuration being nestable with said membrane member selected configuration to define an annular convolute wherein said fabric member defines an axial clearance with said membrane member;
    said membrane member and said fabric member being united without interbonding in said flexing portion for movement in unison in response to fluid pressure applied to said membrane member, fluid pressure forces on said membrane member being conveyed exclusively therein below a selected level for said fluid pressure while said axial clearance is maintained, and said fabric member supportively receives fluid pressure forces from said membrane member only above said selected fluid pressure level at which said membrane member stretches to fully engage said fabric member without axial clearance, and the woven fibers of said cloth are free to move relative one another in said flexing portion.

2. The invention of claim 1 wherein each of said membrane member and said fabric member define a respective radially extending flange portion, the flange portions of each said membrane member and fabric member being congruent.

3. The invention of claim 1 wherein each of said membrane member and said fabric member in their unrestrained condition define a respective substantially cylindrical or slightly frustroconical flexing portion, said flexing portion of diaphragm forming an annular convolute.

4. The invention of claim 2 wherein said membrane member and said fabric member are further adhesively intersecured only at said flange portion of each.

5. A diaphragm comprising:
    a gas-impermeable flexible elastomeric membrane member having a first face thereof exposed to a relatively higher fluid pressure effecting a force on said membrane member, said membrane member having a pair of relatively movable portions interconnected by a flexing portion, said flexing portion being free of fibrous inextensible reinforcing material;
    a gas-permeable flexible substantially inextensible fibrous reinforcing fabric member in supporting relationship with a second face of said membrane member opposite said first face, said fabric member communicating a relatively lower fluid pressure to said second face to effect said force on said membrane member, said fabric member similarly having a respective pair of relatively movable portions interconnected by a respective flexing portion, said fabric member being free of elastomeric material in said flexing portion thereof;

wherein said flexing portion of said membrane member is unsupported by said flexing portion of said fabric member at differential fluid pressure levels lower than a determined value, said membrane member stretching to be supportingly engaged by said fabric member in the flexing portions of each at differential fluid pressures above said determined value.

6. The diaphragm of claim 5 wherein the flexing portion of each of said membrane member and said fabric member define respective annular convolutes.

7. The diaphragm of claim 5 wherein each of said fabric member and said membrane member define substantially identical shapes.

8. The invention of claim 7 wherein said membrane member and said fabric member are each hat-shaped.

* * * * *